United States Patent
Ashton et al.

(10) Patent No.: US 10,633,108 B2
(45) Date of Patent: Apr. 28, 2020

(54) AIRCRAFT FUEL TANK INERTING SYSTEM

(71) Applicant: EATON LIMITED, Titchfield, Hampshire (GB)

(72) Inventors: Dominic Ashton, Ladera Ranch, CA (US); John Wood, Porthtowan (GB); John Foster, Southampton (GB)

(73) Assignee: EATON INTELLIGENT POWER LIMITED, Dublin (IE)

(*) Notice: Subject to any disclaimer, the term of this patent is extended or adjusted under 35 U.S.C. 154(b) by 7 days.

(21) Appl. No.: 14/398,484

(22) PCT Filed: Apr. 29, 2013

(86) PCT No.: PCT/EP2013/058908
§ 371 (c)(1),
(2) Date: Nov. 3, 2014

(87) PCT Pub. No.: WO2013/164311
PCT Pub. Date: Nov. 7, 2013

(65) Prior Publication Data
US 2015/0096984 A1  Apr. 9, 2015

(30) Foreign Application Priority Data
May 2, 2012 (GB) .................. 1207718.6

(51) Int. Cl.
*B64D 37/32* (2006.01)
*B64C 3/34* (2006.01)
*B64D 37/08* (2006.01)

(52) U.S. Cl.
CPC ............. *B64D 37/32* (2013.01); *B64C 3/34* (2013.01); *B64D 37/08* (2013.01); *Y02T 50/44* (2013.01); *Y10T 137/0379* (2015.04); *Y10T 137/3133* (2015.04)

(58) Field of Classification Search
CPC ...................................................... B64D 37/32
USPC ........................................................ 244/135 R
See application file for complete search history.

(56) References Cited

U.S. PATENT DOCUMENTS

| | | | |
|---|---|---|---|
| 2,356,906 A * | 8/1944 | Zitza | B64D 37/06 244/135 R |
| 3,691,730 A * | 9/1972 | Hickey | B64D 37/32 220/88.3 |
| 3,732,668 A * | 5/1973 | Nichols | B64D 37/32 220/88.3 |
| 6,237,873 B1 | 5/2001 | Amaoka et al. | |
| 6,439,506 B1 | 8/2002 | Schlegel et al. | |

(Continued)

FOREIGN PATENT DOCUMENTS

| | | |
|---|---|---|
| DE | 102008007932 A1 | 8/2009 |
| EP | 0967147 A2 | 12/1999 |

(Continued)

*Primary Examiner* — Brian M O'Hara
*Assistant Examiner* — Keith L Dixon
(74) *Attorney, Agent, or Firm* — Leydig, Voit & Mayer, Ltd.

(57) ABSTRACT

An aircraft fuel tank system includes at least one fuel tank having a plurality of interconnected bays and a vent arranged so as to allow an inward venting of atmospheric air. The system is arranged so as to direct the inwardly vented air along a vent duct. The vent duct is arranged so as to convey the inwardly vented air to substantially each one of the interconnected bays.

21 Claims, 4 Drawing Sheets

(56) References Cited

U.S. PATENT DOCUMENTS

| | | | | |
|---|---|---|---|---|
| 6,739,359 B2* | 5/2004 | Jones | ............... | B64D 37/32 |
| | | | | 141/1 |
| 7,621,483 B2* | 11/2009 | Cozens | ............ | B64D 37/14 |
| | | | | 137/589 |
| 7,625,434 B2* | 12/2009 | Tom | ............... | B01D 53/0446 |
| | | | | 244/135 R |
| 8,074,932 B2 | 12/2011 | Surawski | | |
| 8,789,794 B2* | 7/2014 | Krug | ............... | B64D 37/32 |
| | | | | 137/447 |
| 2008/0017248 A1 | 1/2008 | Massey et al. | | |
| 2011/0042520 A1 | 2/2011 | Glaser et al. | | |
| 2011/0068231 A1 | 3/2011 | Surawski | | |
| 2011/0133033 A1 | 6/2011 | Surawski | | |
| 2012/0193479 A1* | 8/2012 | Roscoe | ............ | B64D 37/08 |
| | | | | 244/135 R |

FOREIGN PATENT DOCUMENTS

| | | |
|---|---|---|
| EP | 1084952 A2 | 3/2001 |
| GB | 2411352 A | 8/2005 |
| JP | 2000006893 A | 1/2000 |
| JP | 2011063259 A | 3/2011 |
| JP | 2011105266 A | 6/2011 |
| WO | WO 2011010123 A1 | 1/2011 |

* cited by examiner

Jet directed at top skin – energy lost

FIG. 9

Put deflector on top of float valve to direct flow along stringer

AIRCRAFT FUEL TANK INERTING SYSTEM

CROSS-REFERENCE TO PRIOR APPLICATIONS

This application is a U.S. National Stage Application under 35 U.S.C. § 371 of International Application No. PCT/EP2013/058908 filed on Apr. 29, 2013, and claims benefit to British Patent Application No. GB 1207718.6 filed on May 2, 2012. The International Application was published in English on Nov. 7, 2013 as WO 2013/164311 A1 under PCT Article 21 (2).

FIELD

This invention relates to aircraft fuel tank systems and to methods for inerting aircraft fuel tanks.

BACKGROUND

Regulations require that the fuel tanks of civil aircraft are rendered inert, that is to say that the flammability hazard posed by the fuel tank is reduced, by maintaining the oxygen concentration below a pre-set limit—typically 11.9% oxygen by volume at sea level but can vary from 9% to 12%. It will be appreciated that an inflow of gas into the aircraft fuel tank is required both to make up for the burn rate of the fuel exiting the tank, and also to maintain the pressure differential across the tank within the structural design limits during descent. The mass flow rate required during descent is therefore relatively high as a substantial mass is required to pressurize the tank.

Aircraft are fitted with systems to reduce the flammability of the mixture of gas and fuel vapour that exists in the (ullage) space above the liquid fuel within the tanks. A means of flammability reduction is to replace the air within the ullage space with Nitrogen Enriched Air (NEA), in which the concentration of nitrogen is greater than ambient air and the concentration of oxygen is lower.

A preferred type of system is the "continuous flow" as opposed to the store gas system. In the continuous flow system type, the NEA is generated on demand by an air separation device. In stored gas systems, nitrogen or NEA is held in storage vessels as compressed gas or by physical adsorption in a medium.

The continuous flow type of system tends to be lighter and less complex than the stored gas class of system The size of a continuous flow system may be minimised by filling the fuel tanks with NEA having a low concentration of oxygen prior to the period of descent or rapid descent and supplying sufficient NEA to the tanks to ensure that the bulk average of the oxygen concentration at the end of descent is less than the pre-set limit. A problem with this sizing condition is that in the case where the flow of NEA is insufficient to prevent the inflow of air, the air enters the tank at one or more vent valves (typically two per tank). Consequently, in the zones local to the vent port or valve, the oxygen concentration is greater than the pre-set limit, creating an ignition "pocket". Such a pocket tends to be concentrated by the wing ribs or any internal structure or baffles.

SUMMARY

In an embodiment, the present invention provides an aircraft fuel tank system including at least one fuel tank having a plurality of interconnected bays and a vent arranged so as to allow an inward venting of atmospheric air. The system is arranged so as to direct the inwardly vented air along a vent duct. The vent duct is arranged so as to convey the inwardly vented air to substantially each one of the interconnected bays.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an aircraft fuel tank inerting system capable of overcoming or mitigating at least some of the disadvantages of existing systems.

According to one embodiment of the invention there is provided an aircraft fuel tank system comprising at least one fuel tank comprising a number of interconnected bays and a vent arranged to allow the inward venting of atmospheric air, the system being arranged to direct inwardly vented air along a vent duct, the duct being arranged to convey inwardly vented air to substantially each of the interconnected bays.

Advantageously, according to this embodiment of the invention, the inwardly vented air may be effectively distributed across the ullage of the tank, resulting in smaller pockets of increased oxygen levels that mix relatively quickly in the ullage gases; thus reducing risk. This may be contrasted with known systems.

Figure 1:
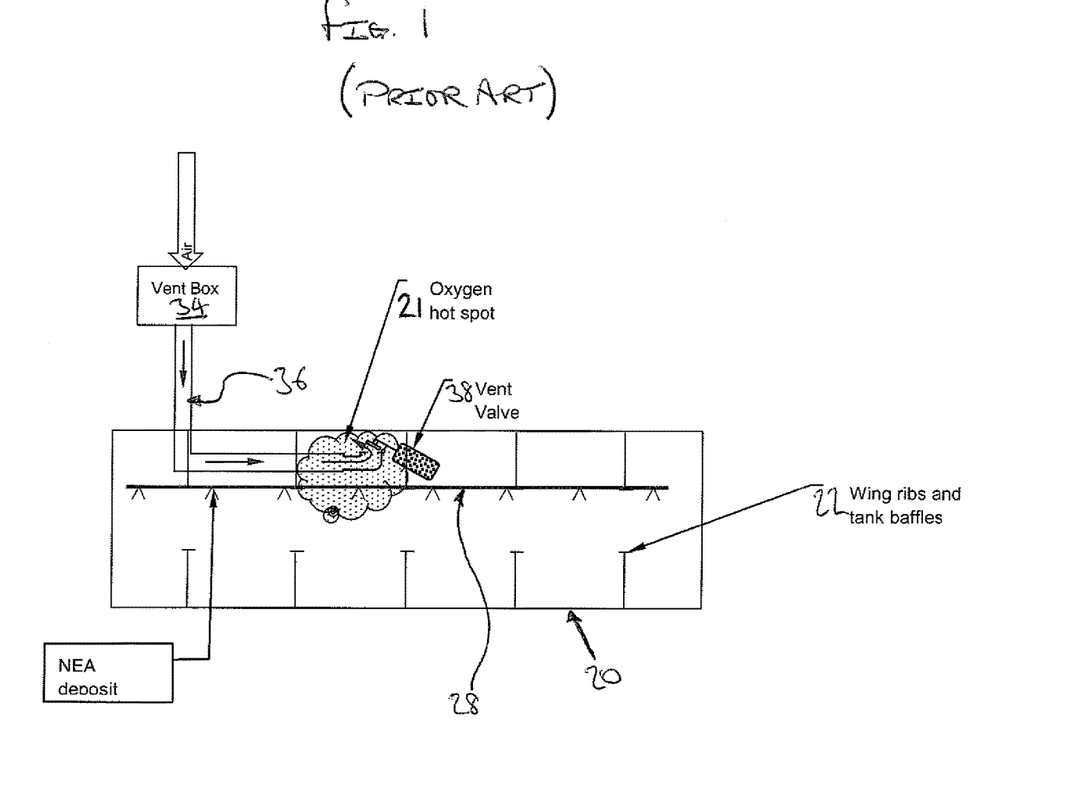
FIG. 1 is a schematic view of a prior art aircraft fuel tank inerting system.

One such known system is shown in FIG. 1. FIG. 1 shows a fuel tank 20, which is divided into inter-connecting bays by wing ribs and/or tank baffles 22. The fuel tank also includes a duct 28 for carrying nitrogen-enriched air. Venting to the external atmosphere occurs via a vent box 34 and a vent distribution duct 36 leading to a vent valve 38 located in the fuel tank. Generally, during inward venting a volume of oxygen rich gas 21 may develop in the region of the vent valve. This may exceed the pre-set oxygen concentration limit, posing a risk to the aircraft, for some time until the oxygen dissipates throughout the ullage.

Another such system is one for mixing of the incoming vent gas with the NEA already in the fuel tank ullage space, through the use of a jet pump or ejector, the secondary flow of which is arranged to pick up the incoming vent gas. A disadvantage of this arrangement is that the zone between the vent float valve inlet and the suction inlet of the jet pump and the zone at the exit of the jet pump ducting are generally flammable and of uncontrolled magnitude.

In one embodiment of the invention, vent air inflow can be distributed to an inert aircraft fuel tank using a float valve to direct the inflowing air into the fuel tank structure so that it is directed by "stringers" that form the wing structure between ribs or equivalent structure or pipework throughout the fuel tank and mixed evenly. The efficient mixing of vent air inflow reduces the demand on the fuel tank inerting system.

An unmodified, conventional float valve can be used in combination with an adapter plate which allows it to be combined with and interact with the structure or pipework of embodiments of the invention.

The invention allows for an inexpensive method of augmenting the inerting capabilities of an aircraft fuel system. It may be conveniently retrofitted and may reduce the load placed on a NEA system allowing for a reduced capacity NEA system to be deployed, reducing costs and weight.

Figure 2:
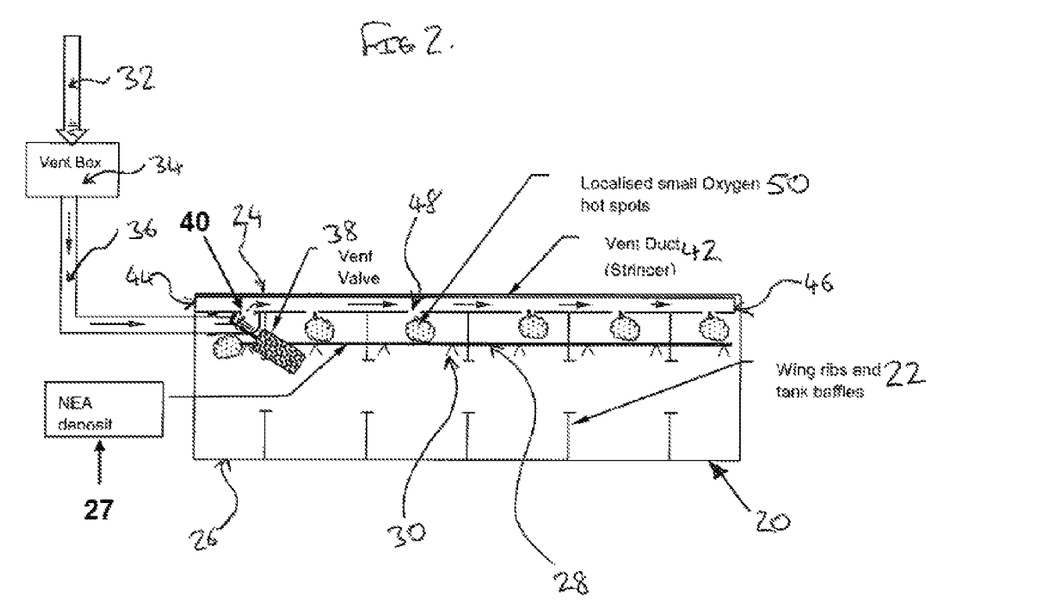
FIG. 2 is a schematic view of an aircraft fuel tank inerting system in accordance with a first embodiment of the invention.

Referring to FIG. 2, an embodiment of the present invention is illustrated. In this embodiment, a fuel tank 20 is schematically illustrated. The fuel tank is divided into interconnecting bays (or volumes), separated by wing ribs and/or tank baffles 22. The fuel tank has an upper surface 24 and a lower surface 26. Upper surface 24 and lower surface 26 may be the upper surface and the lower surface respectively of the aircraft wing. The fuel tank also includes an NEA duct 28. The source of NEA 27 may be any suitable form of air-separation device, typically implementing Hollow Fibre Membrane technology. The aircraft fuel tank 20 is connected to a source of NEA 27 via a control valve. The term "nitrogen-enriched air" or NEA is used in this specification to mean air which has passed through an air-separation device including separation means intended to increase the nitrogen content in the air with a commensurate reduction in the oxygen content. NEA passes along the duct 28 whilst the inerting system is operational and passes via orifices 30 in the duct to the main volume of the fuel tank.

The tank is vented to the external atmosphere. Inwardly vented air 32 passes from the external atmosphere via a conventional vent box 34 and a vent distribution duct 36 to a vent valve 38 located in the fuel tank. It will be appreciated that the same vent arrangement may also be used to allow outward venting. In this embodiment, the vent valve is a conventional float valve, which is shown in more detail in FIGS. 5 and 6. Other suitable valves may instead be used. In the position illustrated in the figure, the float valve is in the open position allowing fluid communication between the vent distribution duct 36 and a vent duct 42. As the level of fuel approaches the float of the float valve, the buoyancy of the float causes the valve to close the vent distribution duct 36 at point 40, sealing the tank from the external atmosphere. In some embodiments however, a controlled leakage at the interface between the vent valve and vent distribution duct 36 is acceptable.

Figure 7A:
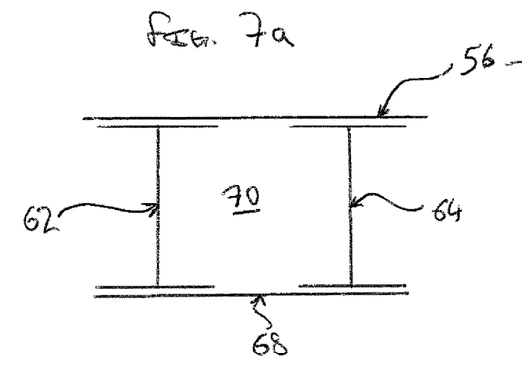
FIGS. 7a and 7b illustrate schematically cross sectional views of stringer assemblies for use in the first or second embodiments.
Figure 7B:
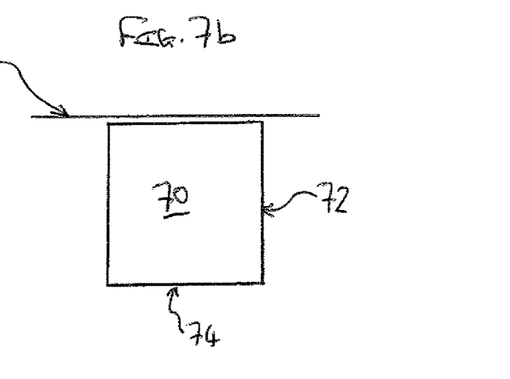

The inward venting air is evenly distributed throughout the fuel tank by the vent duct 42 that is fed by the vent valve. In this implementation the vent duct is formed by a stringer or stringers of the wing, to form a substantially closed conduit, or pipe, examples of which are shown in FIGS. 7a and 7b. FIG. 7a shows in cross section two conventional "I" section stringers, 62 and 64. The stringers 62 and 64 are arranged adjacent to and connected to the aircraft wing skin 56 and a closure surface 68 to form an enclosed volume 70 there between. FIG. 7b shows a box shaped stringer in cross section having four sides 72, again enclosing a volume 70.

The enclosed stringers include holes 48 (illustrated in FIGS. 2 and 3) in the surface 68, 74 opposite the wing skin. The holes 48 meter the incoming air into each zone formed by the wing ribs or baffles such that the bulk average oxygen concentration within each zone is less than the pre-set limit. The distribution of the incoming air, which may occur at vent locations on descent, gives rise to multiple relatively small and localised volumes of increased oxygen content 50. This enables an even distribution and rapid mixing of the inwardly vented oxygen with the existing NEA in the tillage, limiting any risk of ignition to a short period during vent inflow. Moreover, this helps ensure that in the event of any local ignition of an oxygen pocket, by an electrical fault or impact damage or other means, the ignition does not propagate throughout the fuel tank and limits the resulting overpressure to less than the structural capability of the fuel tank.

In the present embodiment, the vent duct 42 is closed at both ends 44 and 46, The number and/or size of the holes 48 machined in it is arranged such that the volume of inwardly vented air entering the main volume of the fuel tank between each pair of wing ribs and/or tank baffles 22 is proportional to the volume between the respective pair of wing ribs and/or tank baffles 22. More generally, the flow characteristics of the holes 48 may be chosen such that the localised volumes of increased oxygen content 50 mix with the existing NEA in the tillage and return to a level less than the pre-set limit at approximately the same rate; thereby further limiting the risk of combustion.

While in this embodiment the vent duct 42 is formed from a stringer, in other embodiments longerons or other stiffening or load-bearing structures may alternatively be used. Alternatively, the vent duct 42 may be formed by a pipe or tube in the fuel tank that serves no other function.

While in this embodiment the vent duct 42 is arranged such that the inwardly vented air is delivered via the holes 48 to each of the interconnected bays between each pair of wing ribs and/or tank baffles 22 this may be varied in other embodiments. In other embodiments, inwardly vented air may be delivered to the majority or more of the bays, or other proportion of the total.

Figure 3:
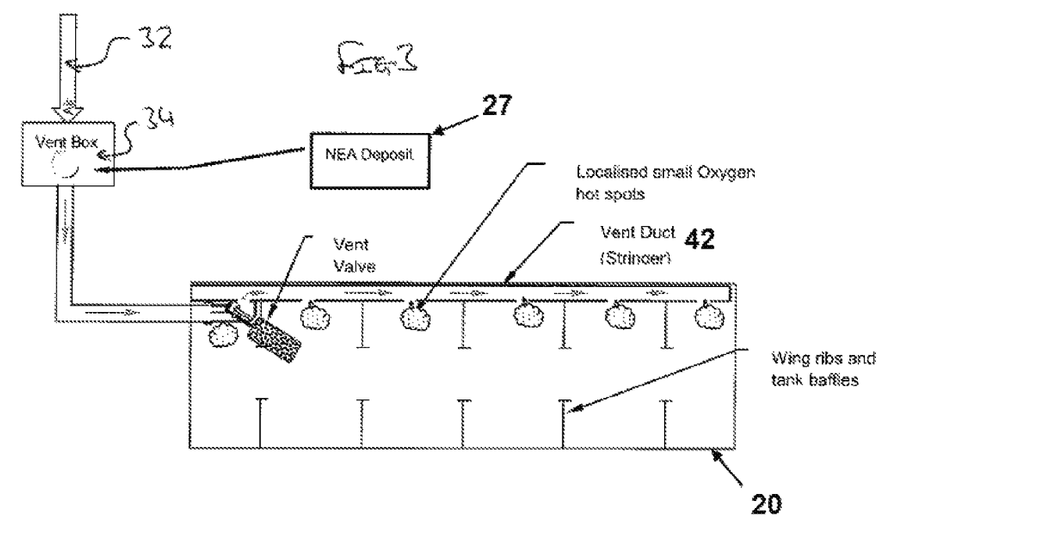
FIG. 3 is a schematic view of an aircraft fuel tank inerting system in accordance with a second embodiment of the invention.

Referring to FIG. 3, a second embodiment of the present invention is illustrated. The second embodiment is similar to the first embodiment. In this and subsequent embodiments, like features are not further described and the same reference numbers are used. In this embodiment the NEA is mixed with the incoming air 32 in the vent box 34 prior to being delivered to the fuel tank when inward venting of atmospheric air occurs. When no inward venting of atmospheric air occurs the NEA may be routed directly to the tank, under the control of a control system. The premixing of the inwardly vented air with the NEA gives rise to an advantage over the system of the first embodiment in that the inwardly vented air 32 is of lower oxygen content on arrival in the fuel tank. Consequently, it takes less time fall below the pre-set oxygen limit figure, through the process of mixing with ullage gases, than would otherwise be the case.

Figure 4:
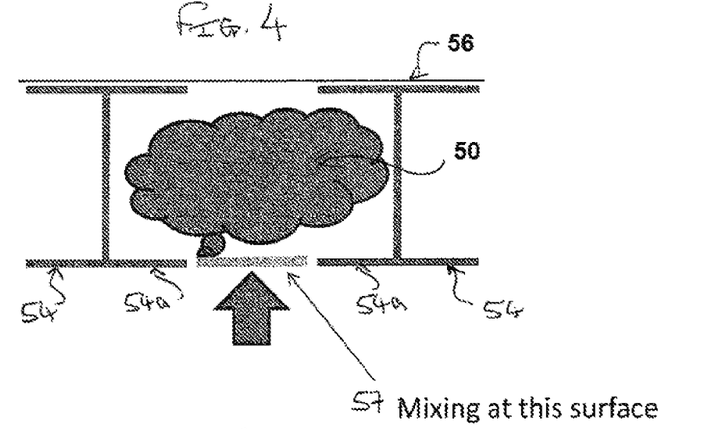
FIG. 4 schematically illustrates a third embodiment of the invention.

Referring to FIG. 4, a third embodiment of the present invention is illustrated. As can be seen from the figure, two "I" section stringers 54 are shown connected to the wing skin 56. Unlike the first and second embodiments, the space between the members 54a of the stringer is left open, illustrated in the figure by the line 57, Thus, as the inwardly vented air 50 travels along the length of the stringer, mixing will occur along the plane or surface 57 between the inwardly vented air 50 and the other gas in the ullage. The characteristics of the system (such as cross sectional area between the stringers, the length of the stringers and the velocity and flow characteristics of the inwardly vented air) will determine the maximum length of stringer assembly that may be traversed by the inwardly vented air. This in turn affects the degree to which the inwardly vented air is distributed across and mixed with the ullage. Where the maximum distance is insufficient to meet requirements, the mixing surface 57 may be narrowed to reduce the degree of mixing per unit length of the vent duct, thus increasing the distance which the inwardly vented air travels along the vent duct. This may be achieved by fixing a strip of material to, and along the length of one of the members 54a, The advantage of leaving an open slot in the vent duct assembly is that the machining operations to create the holes 48 of FIG. 2 may be avoided.

Figure 5:
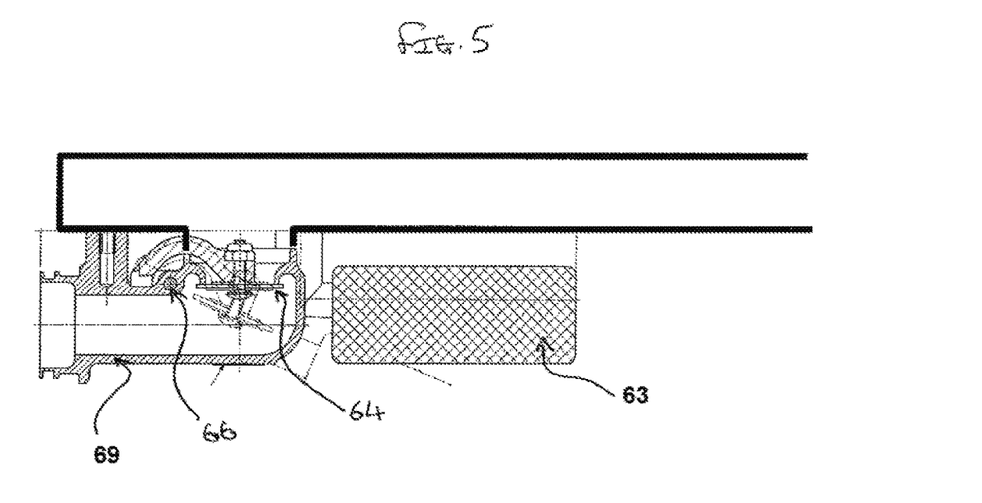
FIG. 5 illustrates a vent valve and vent duct in accordance with the first and second embodiments of the invention.

Referring now to FIG. 5, the vent valve 38 (a conventional float valve) is shown in more detail. As is conventional with such valves, it has a float portion 63 and a sealing portion 64, arranged to pivot as a fixed assembly about pivot 66. In the position shown the sealing unit closes the valve. When the valve is open it is arranged to connect the vent distribution duct 36 and the vent duct 42 via an air flow passage in its cast aluminium body 69.

Figure 6:
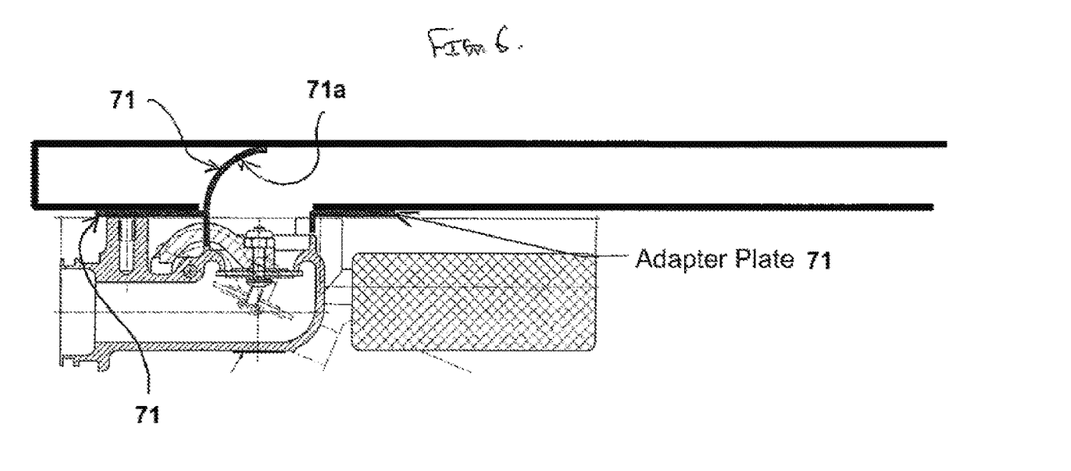
FIG. 6 illustrates an alternative configuration of vent valve, adapter plate and vent duct assembly for use with the first and second embodiments of the invention.

The vent valve 38 may require an adapter plate to allow it to be connected to the vent duct 42. Such an adapter 71 is illustrated in FIG. 6 and may be manufactured from formed aluminium. An adapter plate enables the use of a commercial off the shelf vent float valve. The adapter plate may optionally provide a deflector, or shroud 71a which aerodynamically efficiently directs the flow of incoming vent gas along the duct with low pressure loss.

It will be understood therefore that in embodiments of the invention a float valve is employed which has its outlet into the tank interfaced, either with an adapter or without an adapter, with a duct arranged to carry and/or distribute inwardly vented air into the fuel tank. This may be necessary in such a system where preventing the loss of fuel from the tank is required.

Figure 8:
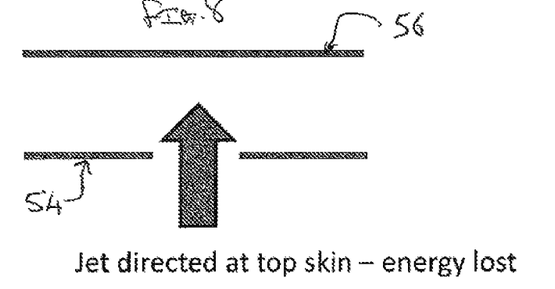
FIG. 8 illustrates the loss in energy of inwardly vented air directed directly at the wing skin.

Referring now to FIG. 8, a longitudinal section of a stringer such as that of FIG. 4 is shown. It will be understood that in the system of the third embodiment, where the inwardly vented air is directed directly at the wing skin (as is illustrated by the arrow in the figure), a significant portion of the kinetic energy of the air is lost. This results in the air 50 travelling a reduced distance along the length of the stringer assembly. This in turn may result in the inwardly vented air not being adequately distributed across and mixed with the ullage gas.

Figure 9:
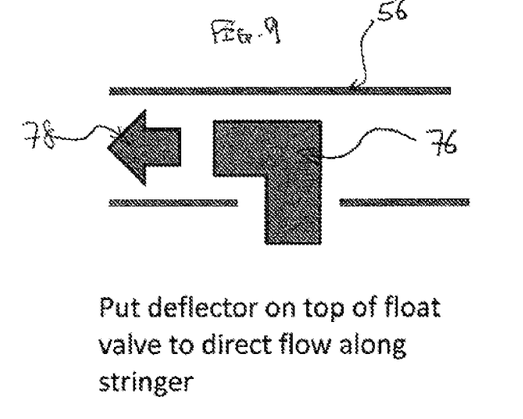
FIGS. 9 and 10 illustrate deflectors that may be deployed in embodiments of the invention in order to direct the inwardly vented air along the length of a vent duct.
Figure 10:
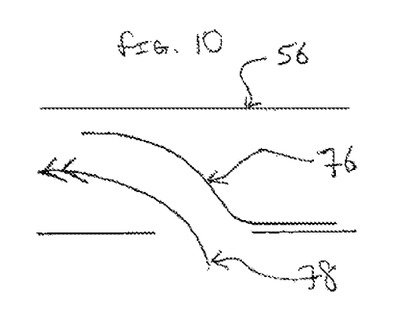

FIGS. 9 and 10 each schematically illustrates a deflector, or shroud 76 which may be attached to the vent valve 38 (FIG. 9) or to the vent duct 42 (FIG. 10) and serves to redirect the inwardly vented air along the length of the vent duct 42 as illustrated by the arrows 78. Preferably the deflector 76 is so shaped as to aerodynamically efficiently redirect the inwardly vented air. In this manner the distance along the vent duct 42 that the inwardly vented air may travel is increased, giving rise to an improved distribution across and mixing with the ullage gas.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Whilst the present invention has been described with reference to particular embodiments, the skilled reader will understand that the scope of the present invention extends beyond these described embodiments. For example:

The first or second embodiments may be modified to give rise to an alternative arrangement employing smaller vent valves at each vent outlet, or hole 48, along the vent distribution duct instead of a single vent valve 38. This solution may provide improved redundancy. However it may increase the probability of a dormant failure of one or more of the multiplicity of small vent valves.

Any of the preceding embodiments may be modified by eliminating the vent valve 38. Aircraft fuel systems exist in which vent ports have no float valve (or other equivalent valve) fitted. It will be understood that the present invention may equally be applied to such systems, particularly those employing a deflector, or shroud, as described above, for efficiently directing the flow of incoming vent gas along the duct with low pressure loss.

Any of the preceding embodiments may be modified by routing the NEA or other inerting gas, such as nitrogen, via the vent duct. This allows for the elimination of the tubes or pipes used in distributing the NEA, such as the NEA duct 28 shown in FIG. 2, with associated weight gains. In such a modified system the NEA or other inerting gas might enter the vent duct either or upstream or downstream of the vent valve (to the extent one is employed). As an alternative to this arrangement a separate NEA plenum formed by a stringer duct could be used. In this manner the NEA, or other inerting gas such as nitrogen, could be routed by a further duct formed by one or more stringers or other structure as described in the embodiments above. In this arrangement, two or more stringer type ducts could be used in a fuel tank, one to convey NEA to the fuel tank and another to convey inwardly vented air. In such an arrangement the NEA flow would be separate to the vent flow which would avoid premature mixing of the two gas flows. As a further alternative to the above arrangement NEA may be routed along a duct that is housed inside the vent stringer duct carrying vent air (42). In this arrangement, and the NEA duct may comprise holes placed to ensure the correct mixing of the NEA and the inwardly vented air. Such holes may be aimed upwards, or towards the wing skin forming part of the fuel tank enclosure.

In yet a further embodiment of the invention a single stringer duct could be employed in a fuel tank or an aircraft, the stringer duct being arranged to carry NEA but not inwardly vented air.

The invention claimed is:

1. An aircraft fuel tank system, comprising:
    at least one fuel tank having a plurality of interconnected bays;
    a vent arranged so as to allow an inward venting of atmospheric air, the vent comprising:
        a vent duct fluidly connecting each of the interconnected bays; and
        a vent box connected to the vent duct, the vent box receiving the inwardly vented atmospheric air, and
    a nitrogen-enriched air (NEA) deposit connected to the vent box and configured to supply NEA to the vent box so as to mix NEA with the inwardly vented atmospheric air so as to provide an NEA/inwardly vented atmospheric air mixture,
    wherein the system is arranged so as to direct the mixture along the vent duct to the interconnected bays, and
    wherein the vent duct is formed by a first stringer of the wing, a second stringer of the wing disposed opposite the first stringer, aircraft wing skin, and a closure surface disposed opposite the aircraft wing skin, or a box shaped stringer of the wing, to form a substantially closed conduit.

2. The aircraft fuel tank system according to claim 1, the system being adapted such that, during operation, a flow rate of the mixture to each respective one of the interconnected bays is approximately in proportion to a volume of the respective one of the interconnected bays.

3. The aircraft fuel tank system according to claim 1, the system being adapted such that, during operation, a flow rate of the mixture to each one of the interconnected bays is regulated such that localised volumes of increased oxygen in each one of the interconnected bays returns to a level less than an oxygen concentration limit at approximately the same rate.

4. The aircraft fuel tank system according to claim 1, wherein the vent duct has a substantially closed cross section.

5. The aircraft fuel tank system according to claim 1, wherein the vent duct has a substantially open channel arranged in a longitudinal direction of the vent duct, the system being adapted such that, during operation, the mixture mixes with ullage gasses though the substantially open channel.

6. The aircraft fuel tank system according to claim 1, further comprising an air flow deflector adapted to direct a flow of the mixture along a length of the vent duct.

7. An aircraft fuel tank system according to claim 1, wherein the mixture exits the vent duct via a plurality of exit apertures.

8. The aircraft fuel tank system according to claim 1, further comprising a controller responsive to an input signal to direct the NEA directly to the at least one fuel tank during periods of operation when no inward venting occurs.

9. The aircraft fuel tank system according to claim 1, further comprising a plurality of valves and a plurality of holes, substantially each of the valves being adapted to regulate fluid flow through a sub-set of the plurality of holes.

10. The aircraft fuel tank system according to claim 1, further comprising a valve and a plurality of holes arranged such that the mixture passes from the vent duct to the interconnected bays through the holes, the valve being arranged so as to regulate fluid flow through the plurality of holes.

11. The aircraft fuel tank system according to claim 10, further comprising an adapter plate arranged so as to connect the valve to the vent duct.

12. The aircraft fuel tank system according to claim 11, the adapter plate further comprising an air flow deflector adapted so as to direct a flow of the mixture along a length of the vent duct.

13. A method of operating an aircraft fuel inerting system that includes a fuel tank having a plurality of interconnected bays, the method comprising:
    inwardly venting air along a vent, the vent comprising:
        a vent duct fluidly connecting each of the interconnected bays; and
        a vent box connected to the vent duct, the vent box receiving the inwardly vented atmospheric air,
    supplying nitrogen-enriched air (NEA) to the vent box so as to mix NEA with the inwardly vented atmospheric air so as to provide an NEA/inwardly vented atmospheric air mixture; and
    distributing the mixture to substantially each one of the interconnected bays,
    wherein the vent duct is formed by a first stringer of the wing, a second stringer of the wing disposed opposite the first stringer, aircraft wing skin, and a closure surface disposed opposite the aircraft wing skin, or a box shaped stringer of the wing, to form a substantially closed conduit.

14. An aircraft fuel tank system, comprising:
    at least one fuel tank with a plurality of interconnected bays;
    a vent configured to allow inward venting of atmospheric air, the vent comprising:
        a vent duct fluidly connecting each of the interconnecting bays; and
        a vent box connected to the vent duct, the vent box receiving the inwardly vented atmospheric air, and
    a nitrogen-enriched air (NEA) deposit connected to the vent box and configured to supply NEA to the vent box so as to mix NEA with the inwardly vented atmospheric air so as to provide an NEA/inwardly vented atmospheric air mixture,
    wherein the system is arranged so as to direct the mixture along the vent duct, the vent duct having a plurality of exit apertures arranged so as to deliver the mixture to a plurality of different locations in the at least one fuel tank, and
    wherein the vent duct is formed by a first stringer of the wing, a second stringer of the wing disposed opposite the first stringer, aircraft wing skin, and a closure surface disposed opposite the aircraft wing skin, or a box shaped stringer of the wing, to form a substantially closed conduit.

15. An aircraft fuel tank system, comprising:
    at least one fuel tank with a plurality of interconnected bays;

a vent configured to allow inward venting of atmospheric air, the vent comprising:
a vent duct fluidly connecting each of the interconnecting bays;
a vent box connected to the vent duct, the vent box receiving the inwardly vented atmospheric air; and
a valve interfacing with the vent duct, and
a nitrogen-enriched air (NEA) deposit connected to the vent box and configured to supply NEA to the vent box so as to mix NEA with the inwardly vented atmospheric air so as to provide an NEA/inwardly vented atmospheric air mixture,
wherein the system is arranged so as to direct the mixture via the valve so as to deliver the mixture to a plurality of different locations in the at least one fuel tank, and
wherein the vent duct is formed by a first stringer of the wing, a second stringer of the wing disposed opposite the first stringer, aircraft wing skin, and a closure surface disposed opposite the aircraft wing skin, or a box shaped stringer of the wing, to form a substantially closed conduit.

16. The aircraft fuel tank system according to claim 15, wherein the valve is adapted in its closed position so as to substantially prevent a loss of fuel from the at least one fuel tank via the vent.

17. The aircraft fuel tank system according to claim 15, wherein the valve is interfaced with the vent duct via an adapter or an adapter plate.

18. The aircraft fuel tank system according to claim 15, wherein the valve is located in the at least one fuel tank.

19. The aircraft fuel tank system according to claim 15, wherein the valve is a float valve.

20. An aircraft fuel tank system, comprising:
at least one fuel tank with a main volume divided into a plurality of interconnected bays;
a vent configured to allow inward venting of atmospheric air, the vent comprising:
a vent duct fluidly connecting each of the interconnecting bays;
a vent box connected to the vent duct, the vent box receiving the inwardly vented atmospheric air; and
a plurality of valves located at a corresponding plurality of different positions in the at least one fuel tank, and
a nitrogen-enriched air (NEA) deposit connected to the vent box and configured to supply NEA to the vent box so as to mix NEA with the inwardly vented atmospheric air so as to provide an NEA/inwardly vented atmospheric air mixture,
wherein the system is arranged so as to channel the mixture along the vent duct, the vent duct interfacing with the plurality of valves which are configured, in an open position, to allow the mixture to exit the vent duct and to enter the main volume of the at least one fuel tank, and
wherein the vent duct is formed by a first stringer of the wing, a second stringer of the wing disposed opposite the first stringer, aircraft wing skin, and a closure surface disposed opposite the aircraft wing skin, or a box shaped stringer of the wing, to form a substantially closed conduit.

21. The aircraft fuel tank system according to claim 20, wherein the valves are float valves.

* * * * *